United States Patent
Senn et al.

(10) Patent No.: US 11,618,502 B2
(45) Date of Patent: Apr. 4, 2023

(54) ON-ROAD LOCALIZATION METHODOLOGIES AND EQUIPMENT UTILIZING ROAD SURFACE CHARACTERISTICS

(71) Applicants: VOLKSWAGEN AKTIENGESELLSCHAFT, Wolfsburg (DE); PORSCHE AG, Stuttgart (DE); AUDI AG, Ingolstadt (DE)

(72) Inventors: Melanie Senn, Mountain View, CA (US); Nils Kuepper, Belmont, CA (US)

(73) Assignees: Volkswagen Aktiengesellschaft; Porsche AG; Audi AG

( * ) Notice: Subject to any disclaimer, the term of this patent is extended or adjusted under 35 U.S.C. 154(b) by 726 days.

(21) Appl. No.: 16/367,449

(22) Filed: Mar. 28, 2019

(65) Prior Publication Data

US 2020/0307692 A1 Oct. 1, 2020

(51) Int. Cl.
| | | |
|---|---|---|
| *B62D 15/02* | (2006.01) | |
| *G01S 17/93* | (2020.01) | |
| *G01S 17/42* | (2006.01) | |
| *G01S 17/931* | (2020.01) | |
| *G01S 7/48* | (2006.01) | |

(Continued)

(52) U.S. Cl.
CPC ......... B62D 15/025 (2013.01); B62D 15/029 (2013.01); G01S 7/4802 (2013.01); G01S 17/42 (2013.01); G01S 17/931 (2020.01); G05D 1/0221 (2013.01); G05D 1/0259 (2013.01);

(Continued)

(58) Field of Classification Search
CPC ..... B62D 15/025; B62D 15/029; G01S 17/42; G01S 17/89; G01S 17/931; G01S 7/4802; G05D 1/0221; G05D 1/0259; G05D 2201/0213; G06K 9/00798; G06K 9/4604; G06K 9/6271; G06V 20/588; G06V 10/44; G06V 10/764; G06V 10/82; B60W 2050/0024; B60W 30/12; B60W 60/001; B60W 60/0015; B60W 2420/52; B60W 2552/00; B60W 2556/20; B60W 2556/25

See application file for complete search history.

(56) References Cited

U.S. PATENT DOCUMENTS 9,476,981 B2 10/2016 Yaacobi et al.
2018/0107215 A1* 4/2018 Djuric .................. G05D 1/0221
(Continued)

FOREIGN PATENT DOCUMENTS

CN 107092020 A * 8/2017 ............. G01C 11/00
DE 102016215932 A1 3/2018
(Continued)

OTHER PUBLICATIONS

Translation for CN107092020 (Year: 2017).*
(Continued)

*Primary Examiner* — Rachid Bendidi
(74) *Attorney, Agent, or Firm* — Barnes & Thornburg, LLP

(57) ABSTRACT

Disclosed embodiments provide a technical improvement for providing localization for a transportation vehicle by detecting road wear reference lines in a roadway on which the transportation vehicle is travelling and controlling, guiding or otherwise facilitating alignment of the transportation vehicle wheel centers with the detected centers of the road wear.

29 Claims, 12 Drawing Sheets

(51) Int. Cl.
  *G05D 1/02*   (2020.01)
  *G06V 20/56*   (2022.01)
(52) U.S. Cl.
  CPC ... *G06V 20/588* (2022.01); *G05D 2201/0213* (2013.01)

(56) References Cited

U.S. PATENT DOCUMENTS

| | | | |
|---|---|---|---|
| 2018/0187460 A1* | 7/2018 | Gordon | B60R 21/0136 |
| 2019/0001976 A1 | 1/2019 | Liu et al. | |
| 2019/0154451 A1* | 5/2019 | Nystrom | G06F 16/29 |
| 2019/0317219 A1* | 10/2019 | Smith | G01S 17/58 |
| 2020/0293750 A1* | 9/2020 | Zuta | G06K 9/00369 |
| 2021/0224613 A1* | 7/2021 | Guo | G06V 20/17 |

FOREIGN PATENT DOCUMENTS

| | | |
|---|---|---|
| EP | 2325064 A1 | 5/2011 |
| WO | 2017184061 A1 | 10/2017 |

OTHER PUBLICATIONS

Search Report and Written Opinion for International Patent Application No. PCT/EP2020/058689; dated Jul. 21, 2020.

Ordonez et al.; Rut Detection and Following for Autonomous Ground Vehicles; Conference Paper; Center for Intelligent Systems, Control and Robotics (CISCOR); Florida State University; Jun. 2009.

\* cited by examiner

ON-ROAD LOCALIZATION METHODOLOGIES AND EQUIPMENT UTILIZING ROAD SURFACE CHARACTERISTICS

CROSS-REFERENCE TO RELATED APPLICATIONS

None

FIELD

The present disclosure relates to method operations and equipment for use in on-road localization for transportation vehicles.

SUMMARY

According to the present disclosure, systems, components, and methodologies are provided to improve localization for a transportation vehicle by detecting road wear reference lines in a roadway on which the transportation vehicle is travelling.

In accordance with disclosed embodiments, systems, components and methodologies enable controlling, guiding, advising or otherwise facilitating alignment of the transportation vehicle wheel centers with the detected centers of the road wear to facilitate improved navigation of the transportation vehicle in relationship to the roadway and, more specifically, lanes of traffic and transitions within those lanes of traffic owing to roadway characteristics including but not limited to merge areas, on/off ramps, roundabouts and other roadway junction areas.

In accordance with at least one disclosed embodiment, the road wear reference line data is used in combination with data detected or accessed by on-vehicle equipment to identify lane markings to control, guide, advise or otherwise facilitate alignment of the transportation vehicle wheel centers with the detected centers of the road wear to facilitate improved navigation of the transportation vehicle in relationship to the roadway. This reference to and analysis of a plurality of data sets generated by a plurality of on-vehicle data sensors and/or accessed in one or more databases provides additional redundancy regarding monitored data, and, therefore, increased safety regarding the on-vehicle systems that enable control, guiding, advisement for navigating the transportation vehicle on the roadway.

In accordance with at least one disclosed embodiment, the road wear reference line data may also be used to assist in clarifying or analyzing data detected or accessed by on-vehicle equipment to identify lane markings, for example, when lane markings are not visible or are confusing. This reference to and analysis of a road wear reference line data improves safety by augmenting lane marking data generated by one or more on-vehicle data sensors or accessed in one or more databases.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1A:
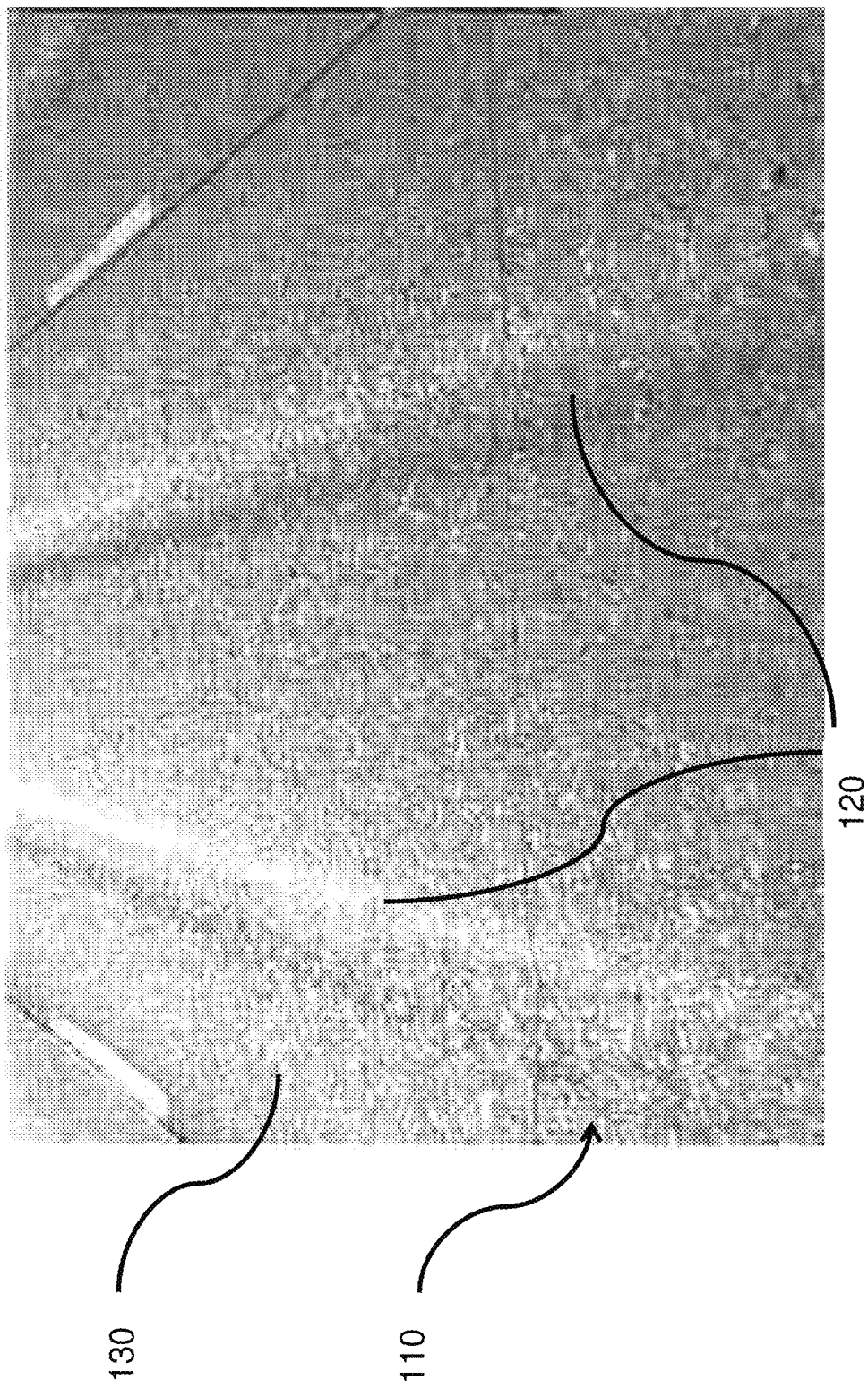
FIGS. 1A-1D illustrate examples of characteristics of road surface on roadways, such as road wear or wheel ruts.
Figure 1B:
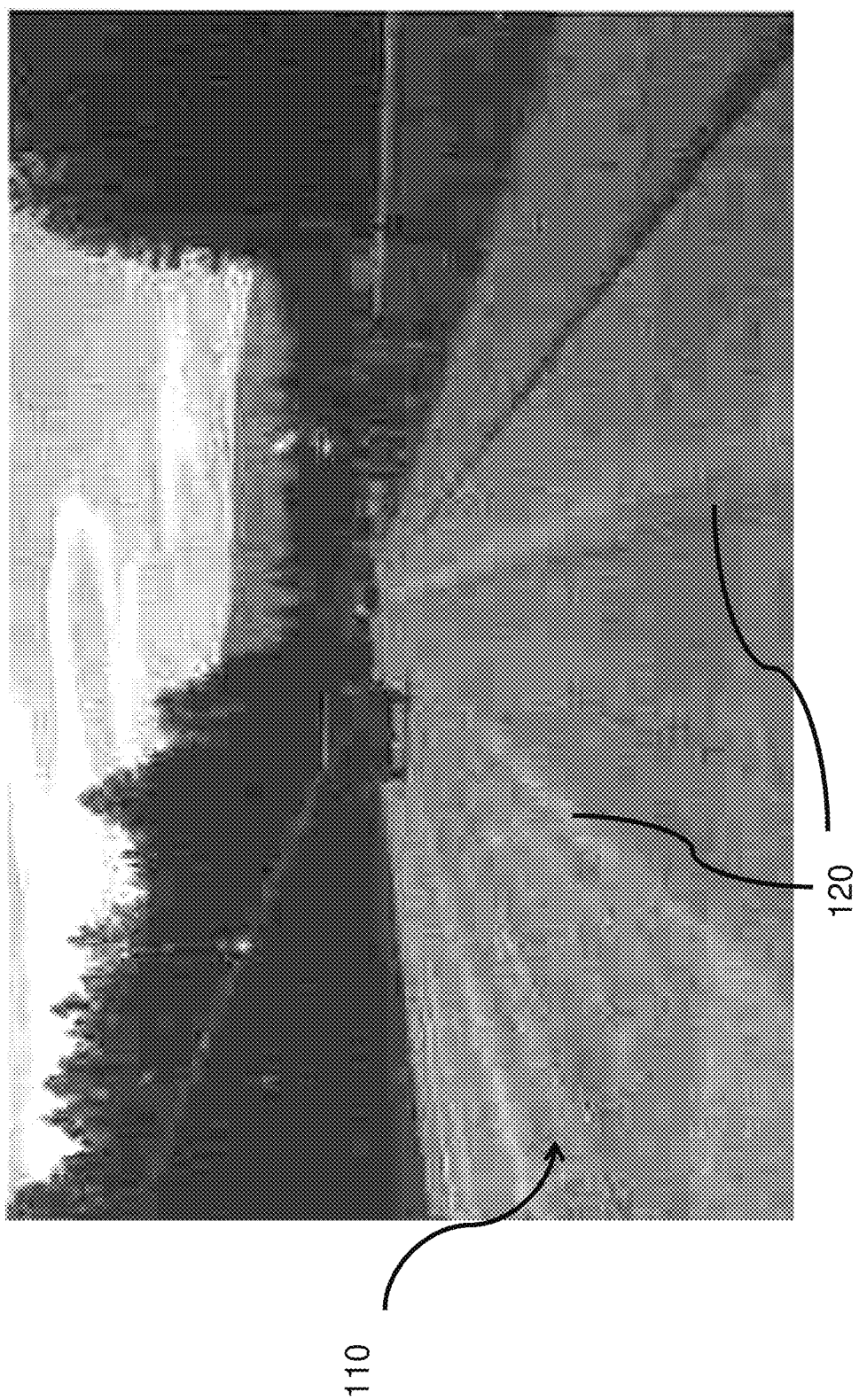

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Disclosed embodiments provide a technical solution for improving localization for a transportation vehicle by detecting road wear reference lines in a roadway on which the transportation vehicle is travelling and controlling, guiding or otherwise facilitating alignment of the transportation vehicle wheel centers with the detected centers of the road wear.

For the purpose of this disclosure, the term "roadway" includes any road, thoroughfare, route, or way on land between two places that has been paved or otherwise improved to allow travel by a transportation vehicle including not limited to a motor vehicle or other transportation vehicle including one or more wheels. Thus, it should be understood that such roadways may include one or more lanes and junctions with other roadways including on/off ramps, merge areas, etc., that may be included in parkways, avenues, boulevards, freeways, tollways, interstates, highways, or primary, secondary, or tertiary local roads.

For the purposes of this disclosure, the term "on-road localization" is used to refer to the ability to determine a position of the transportation vehicle relative to the roadway, or a portion of a roadway such as a lane, on which the transportation vehicle is travelling.

With the further incorporation of autonomous and driver assist related transportation vehicle technologies, it is envisioned that, in implementation, autonomous and/or assistive functionality will rely at least partially, and potentially fully, on on-road localization performed in an automated or semi-automated manner based on Global Positioning Service (GPS) data as well as data generated by a plurality of sensors located on-vehicle. As explained below, various conventional approaches are known for performing on-road localization using various different types of sensors; however, each of those approaches has deficiencies with regard to quality/amount of data to be processed and/or the time and computational load for processing that is an obstacle to real world use in real time to control transportation vehicle travel safely.

For the purposes of this disclosure, the phrase "autonomous and/or assistive functionality" refers to functionality that enables the partial, full or complete automation of vehicular control ranging and encompassing what has presently come to be known as the five levels of driving automation. Thus, it should be understood that autonomous and/or assistive functionality refers to operations performed by a vehicle in an automated manner by on-vehicle equipment or the output of alerts, prompts, recommendations or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) if the vehicle is leaving its lane (visual, audible, and/or vibration warnings) and which warn the driver and, if no action is taken, automatically take steps to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surrounding to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems which take over steering, keep the transportation vehicle centered in the lane of traffic.

Likewise, autonomous and/or assistive functionality may include high automation (level four) and complete automation (level five), wherein on-vehicle equipment enable automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

With this understanding of potential implementation of on-vehicle sensors for autonomous and/or assistive functionality in mind, presently disclosed systems, components, and methodologies may be provided to improve localization for a transportation vehicle by detecting road wear reference lines in a roadway on which the transportation vehicle is travelling so as to enable such functionality.

Conventional transportation vehicle navigation systems, as well as, conventional autonomous vehicles use GPS technology for their on-road localization. However, a deficiency of conventional use of global localization using GPS is that localization is limited to a certain level of accuracy, more specifically 5-10 meters in the best case (which typically requires a geographical area that provides an unobstructed, open view to the sky). Moreover, lower accuracy is much more likely in geographical areas that include relatively large buildings, trees or geographic contours such as canyons. This is because GPS based location services require signals from GPS satellites. Dense materials, for example, rock, steel, etc.), tall buildings, and large geographical terrain features may block or degrade GPS signals.

Therefore, GPS has been conventionally combined with local landmarks for on-road localization, for example, lane markings to improve the ability for a vehicle with autonomous and/or assistive vehicle functionality to accurately perform on-road localization. Conventionally, these local landmarks have been detected and identified from camera images or sensor data from other sensors obtained by one or more cameras/sensors located on-vehicle. For example, it has been conventionally discussed to combine GPS data with data collected from front view cameras and LiDAR, and, even data generated by ground penetration radar. In addition, it has been discussed that there is utility for such cameras to extract a reduced feature presentation of roadway characteristics from on-vehicle cameras to generate data indicating roadside patterns that may be analyzed to perform on-road localization. Additionally, high-speed longitudinal road profiling with discrete point measurements of a laser has been conventionally combined with CMOS line scan camera technology for autonomous and/or assistive functionality for transportation vehicles.

However, on-road localization based on lane markings, with or without use of GPS, still remains insufficient in many situations because, for example, conventionally available technology fails to be able to distinguish between an actual driving lane and, for example, an upcoming concrete lane divider. This is because both the driving lane and the concrete lane divider are bounded by left and right lane markings.

Disclosed embodiments are based on a recognition that recent autonomous vehicle traffic accidents provide evidence that there is a technical and real world need to increase the robustness and/or reliability of data used for autonomous and/or assistive vehicle equipment and systems by using a combination of data generated by a plurality of different sensors, and different types of sensors, to ensure that, should data from one sensor or one type of sensor become unavailable or unreliable, data from another sensor or another sensor type may be utilized.

Thus, in accordance with disclosed embodiments, systems, components and methodologies enable controlling, guiding, advising or otherwise facilitating alignment of the transportation vehicle wheel centers with the detected centers of the road wear to facilitate improved navigation of the transportation vehicle in relationship to the roadway and, more specifically, lanes of traffic and transitions within those lanes of traffic owing to roadway characteristics including but not limited to merge areas, on/off ramps, roundabouts and other roadway junction areas.

Of note, road wear, such as wheel ruts, is visually less obvious compared to lane markings, which are conventionally used for on-road localization. A road rut is a depression, groove or other elimination of material on a road surface worn away from a roadway by the travel of wheels of transportation vehicles. Ruts can be formed by wear, for example, from studded snow tires common in cold climate areas, or they can form through the deformation of the asphalt concrete pavement or subbase material. Regardless of the physical mechanism for forming the rut, the rut itself is indicative of past, repeated (and theoretically, safe) transportation vehicle traversal of the roadway on a path that includes the rut. As a result, by aligning present operation of a transportation vehicle with these ruts, the probability of increasing safety of such operation is, at least theoretically, increased.

As shown in FIGS. 1A-1D, characteristics of road surface on a roadway 110, such as road wear or wheel ruts 120 indicate the repeated traversal of that roadway by transportation vehicles in the past. Thus, it should be appreciated that wheel ruts 120 run generally parallel to lane markings denoting a traffic lane 130. This is generally true except when multiple pathways for traversing a traffic lane 130 or region of roadway 110 are present (as discussed herein with reference to FIG. 6).

Figure 1C:
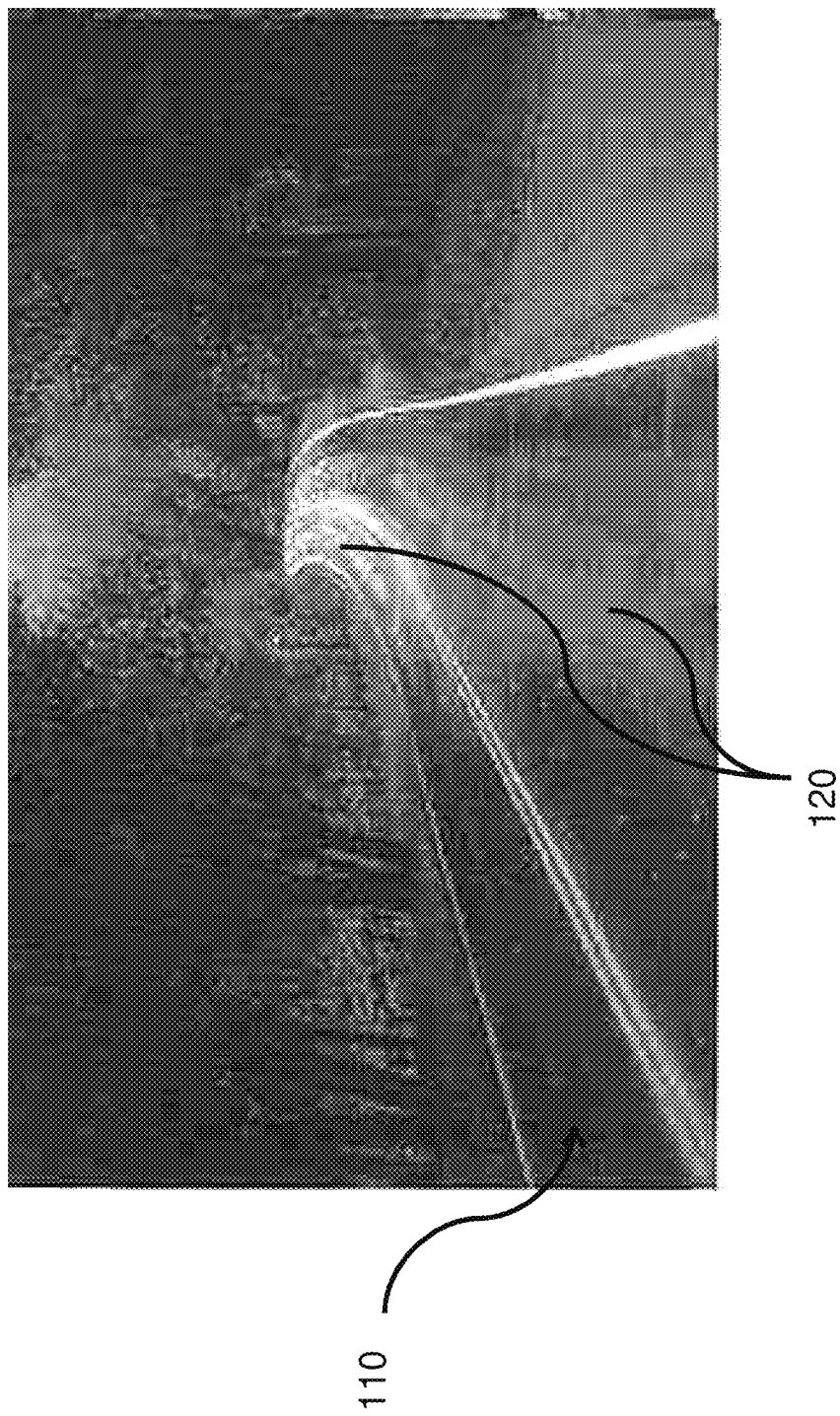
Figure 1D:
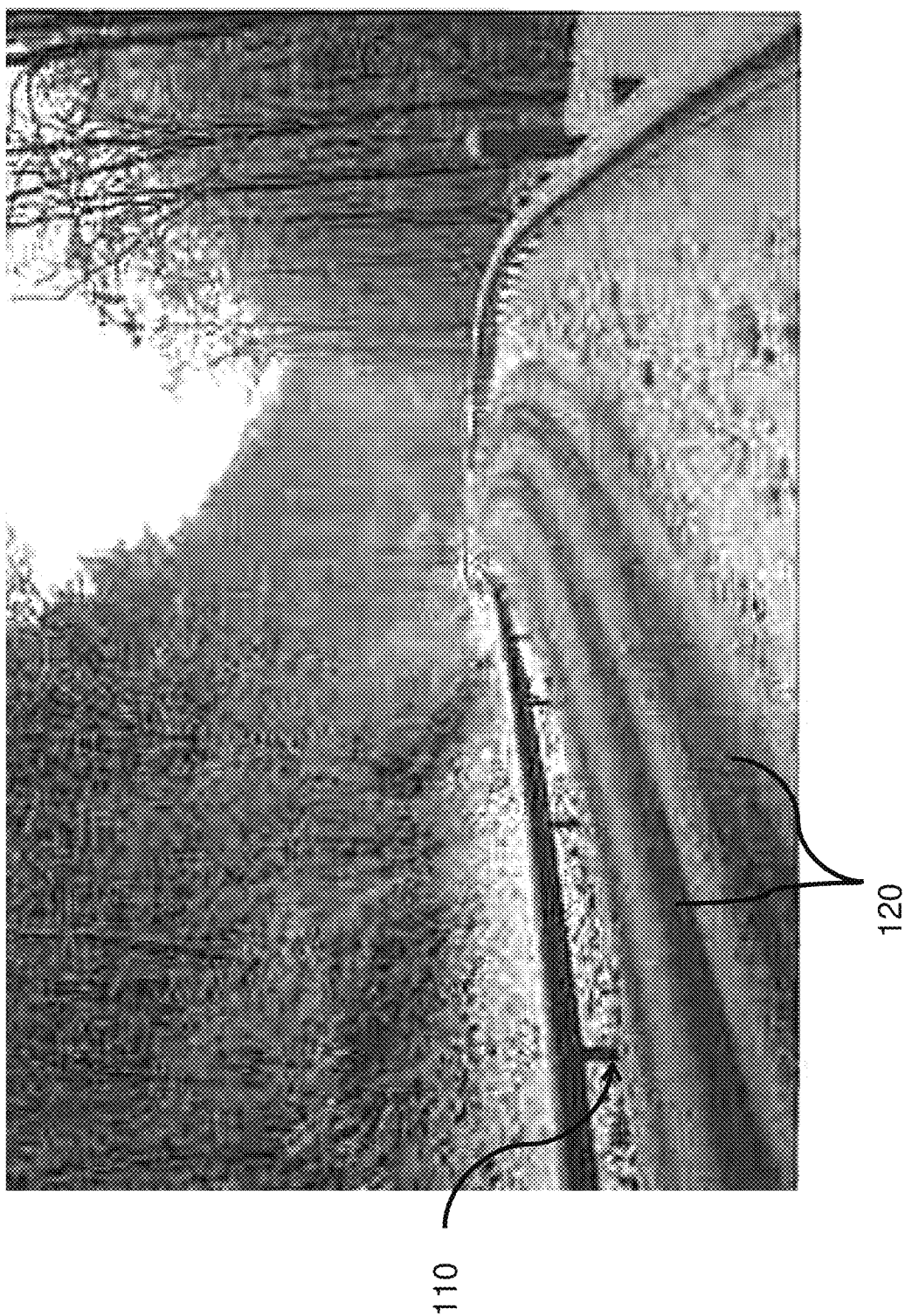

Accordingly, sensing and analyzing the position of such wheel road surface characteristics may improve the ability to perform on-road localization for autonomous and/or assistive driving functionality provided by on-vehicle equipment. Of note, this may be particularly true when precipitation results in pooling of water (which may reflect light) in the ruts 120, as shown in FIG. 1C, and/or when precipitation results in obscured lane markings on the roadway 110, as shown in FIG. 1D.

Implementing the above described, conventionally known, on-road localization technologies has been limited because of both the quality and the amount of sensed data being analyzed. The quality of the data affects the accuracy of determinations made based on analysis of that data. The amount of data affects the time required to analyze the data, rendering implementation for autonomous and/or assistive functionality difficult or impossible, depending on which conventional technologies are implemented.

To the contrary, disclosed embodiments utilize recently developed LiDAR sensors with advanced Frequency Modulated, Continuous Wave (FMCW) capabilities that have recently became available in the automotive industry.

Conventional LiDAR measures distance to one or more targets by illuminating the targets with pulsed laser light and measuring the reflected pulses with a sensor. Differences in laser return times and wavelengths can then be used to make digital 3D representations of the target.

Recently developed LiDAR components, such as those now commercially available from Blackmore Inc. systems (of Bozeman, Mont.) combine coherent optical telecommunications hardware with radar signal processing techniques to provide FMCW LiDAR that provides improved sensor sensitivity, robustness and velocity measurement. As a result, such FMCW LiDAR equipment are capable of increased functionality in sensing, or "seeing" both bright and dark objects that are included in a transportation vehicle environments. In particular, for the purposes of the presently disclosed embodiments, dark objects such as roadway surfaces, and the ruts in those roadway surfaces may be detectable. For example, the intensity data (dark/bright) might be an indicator of the rut position but also the actual number of returns and how the returns of the LIDAR are distributed may be analyzed to determine rut location. Theoretically, it is possible that the speckle information as described below may provide characteristic insight into where the road surface varies in roughness, which, in turn, might be an additional indicator for determining the center of the lane. A critical factor for this principle to work is the integration time of the light pulses. If the time on target for a given ray is short enough, the speckle pattern might influence the point cloud in such a way, that it provides the information needed for detecting road marks or characteristic road wear.

The capability was not available using conventional direct Time of Flight (dToF) because such those sensors do not show any speckle artifacts. Rather, dToF implemented LiDAR determines distance based on the known speed of light, measuring the time-of-flight of a discrete light signal between the LiDAR and the subject for each point of the scan.

To the contrary, FMCW LiDAR provides coherent LiDAR using a continuously-emitting laser that varies its frequency through a range and compares the frequency of returned signals with corresponding local reference signal to determine distance. Moreover, FMCW LiDAR, and Blackmore Inc.'s LiDAR components can determine an object's relative velocity, which aids in the speed and capability to identify shapes of environmental objects from a moving transportation vehicle.

Figure 2:
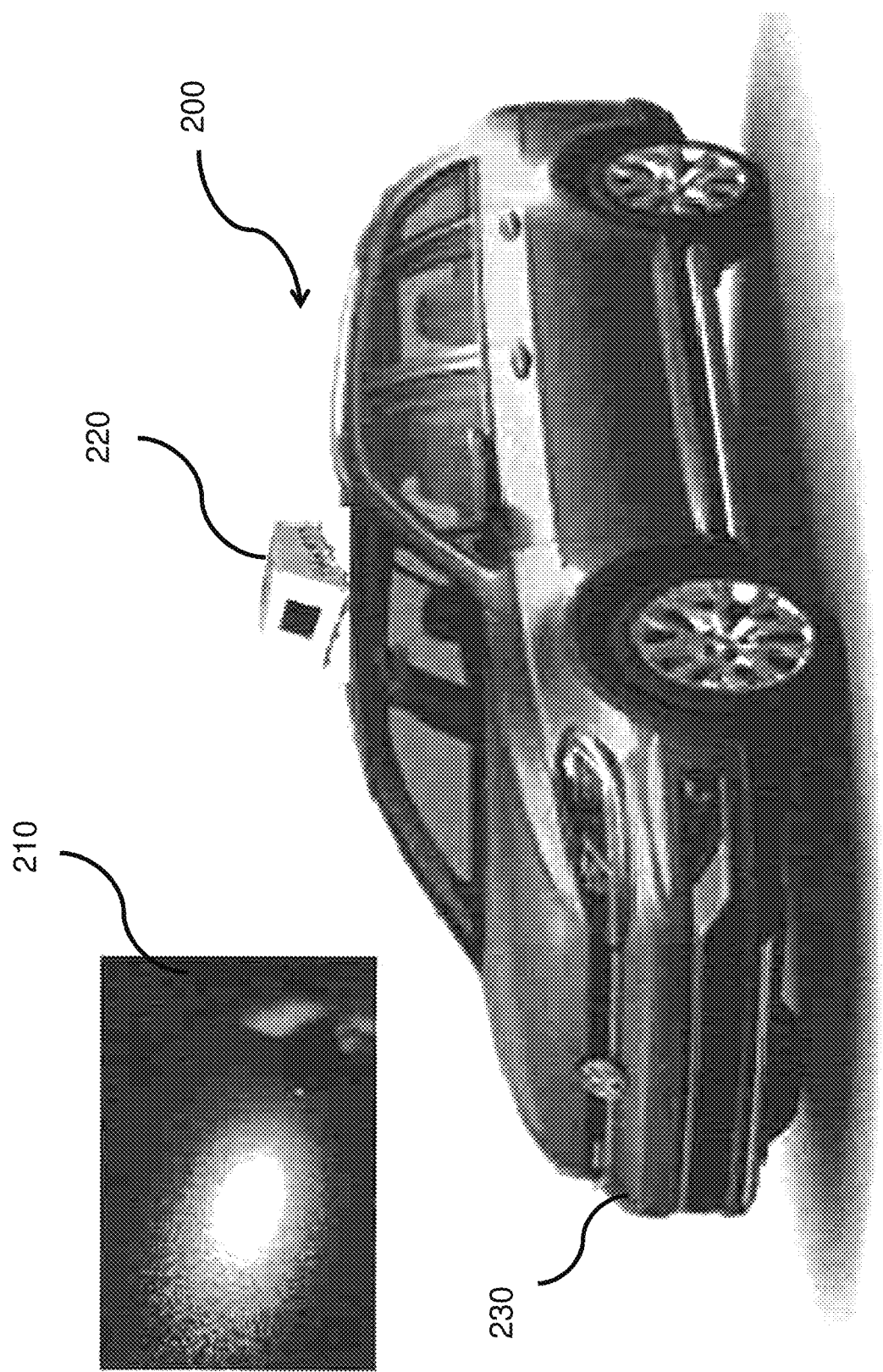
FIG. 2 illustrates an example of a system and constituent components for high-resolution measurement of road surface texture at high frame rates with a Frequency Modulated Continuous Wave (FMCW) LiDAR sensor in accordance with the disclosed embodiments.

As shown in FIG. 2, disclosed embodiments provide a system 200 and constituent components for high-resolution measurement of road surface texture 210 may be performed at high frame rates with a Frequency Modulated Continuous Wave (FMCW) LiDAR sensor 220 mounted on a transportation vehicle 230. It should be appreciated that software for performing functionality to enable measurement and analysis of data may be performed, at least in part, using software code stored on one or more non-transitory computer readable mediums running on one or more processors (not shown) in the transportation vehicle 230.

The system 200 may operate, for example, in the non-visible spectrum (1550 nm) at a throughput in the range of, for example, 300,000 samples/sec to 1 million samples/sec with a 30 (vertical)×40 (horizontal) field of view and an accuracy in the <5 cm range. Thus, each sample from the FMCW LiDAR sensor 220 may provide information about the Euclidean, metric coordinate of a given point as x, y, z in sensor coordinates, the intensity and the radial velocity of the surface. Moreover, multiple returns can be obtained within one sample per discrete azimuth and elevation angle.

In operation, the FMCW LiDAR sensor 220 generates continuous laser light compared to conventional pulsed LiDARs that send bursts of laser light. The continuously emitted light in FMCW LiDARs is split into two beams, one is sent out to hit the target, and its reflection is combined with the second beam and then evaluated for the actual range and radial velocity measurement. The target light pulse is not perfectly collimated, there is some beam divergence. The back scattered light might constructively or destructively interfere, depending on the roughness of the surface. This effect is known as speckle in the optics domain. It should be appreciated that, in the case of an invalid measurement performed by the FMCW LiDAR 220, for example, caused by not having a surface within range of the sensor or due to speckle, no return is provided.

It should be understood that the FMCW LiDAR sensor 220 is shown in FIG. 2, only as an example of positioning of the sensor. Therefore, the sensor 220 may be located elsewhere on or in the vehicle including, for example, in a front grill of the vehicle or otherwise forward facing so as to implement functionality for sensing and analyzing optical data generated by the sensor 220. However, it should be understood that, for at least some implementations, the sensor 220 should be located higher up on the vehicle (e.g., roof) to provide the most useful data for tracking road position.

In accordance with disclosed embodiments, this data, including information about the number of returns per sample in combination with the full point cloud data, may be used to generate characteristic road surface profiles. Such characteristic profiles may provide sufficient data (quantity and quality) to obtain accurate lateral position data so as to determine on-road localization and/or aid other active and passive measurement sensors (e.g. odometry, camera), located on the vehicle 230. Thus, the analysis of the extracted LiDAR signal can, optionally, be used alone, or in combination with other sensor data for a more robust absolute on-road localization.

Figure 3:
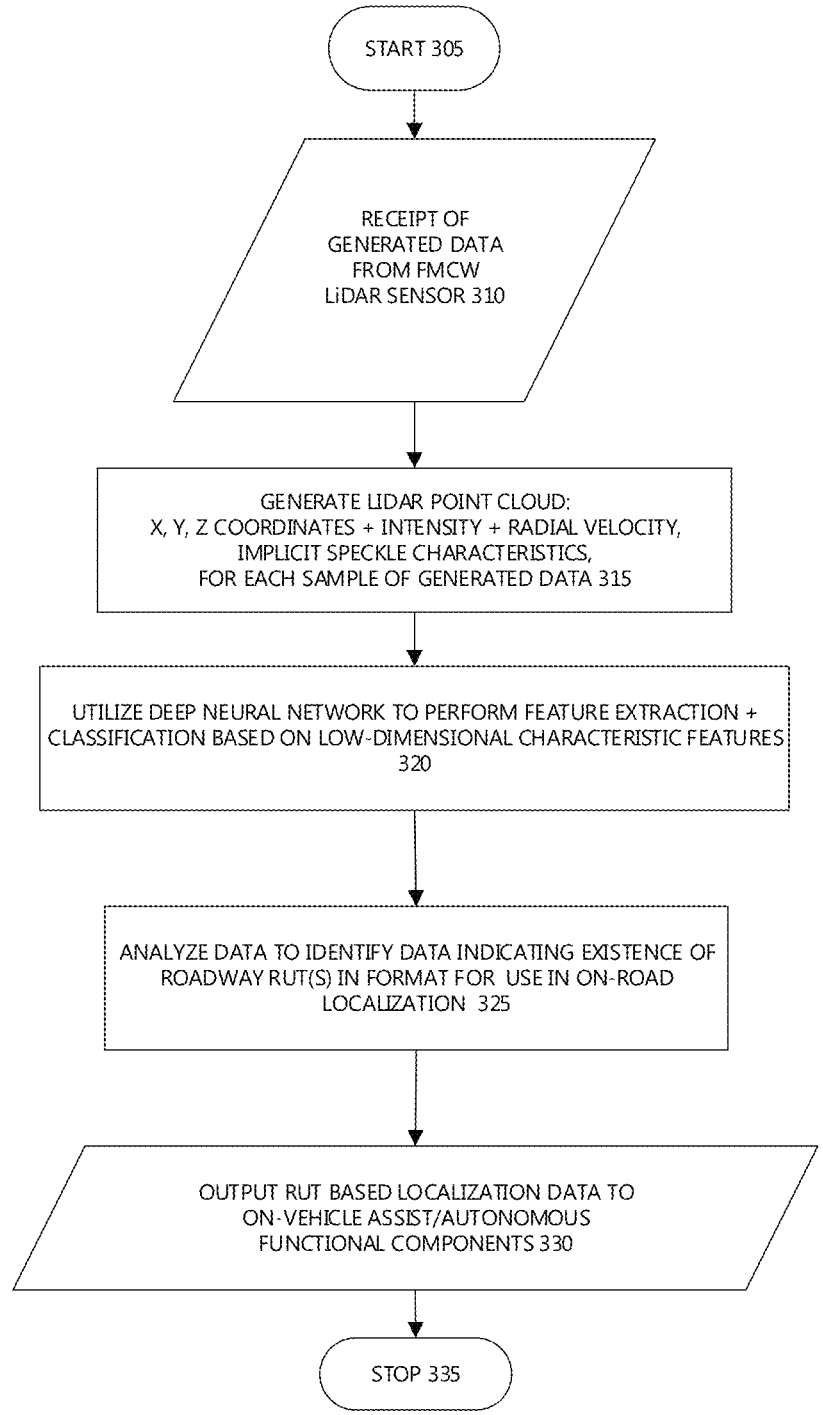
FIG. 3 illustrates operations for performing machine learning methods for data analysis, transforming high-dimensional sensor data generated by an FMCW LiDAR sensor into characteristic low dimensional features that enable differentiation of smooth v. rough surface texture for the purposes of performing on-road localization based on simple and fast processable distinctive criteria in accordance with the disclosed embodiments.
Figure 4:
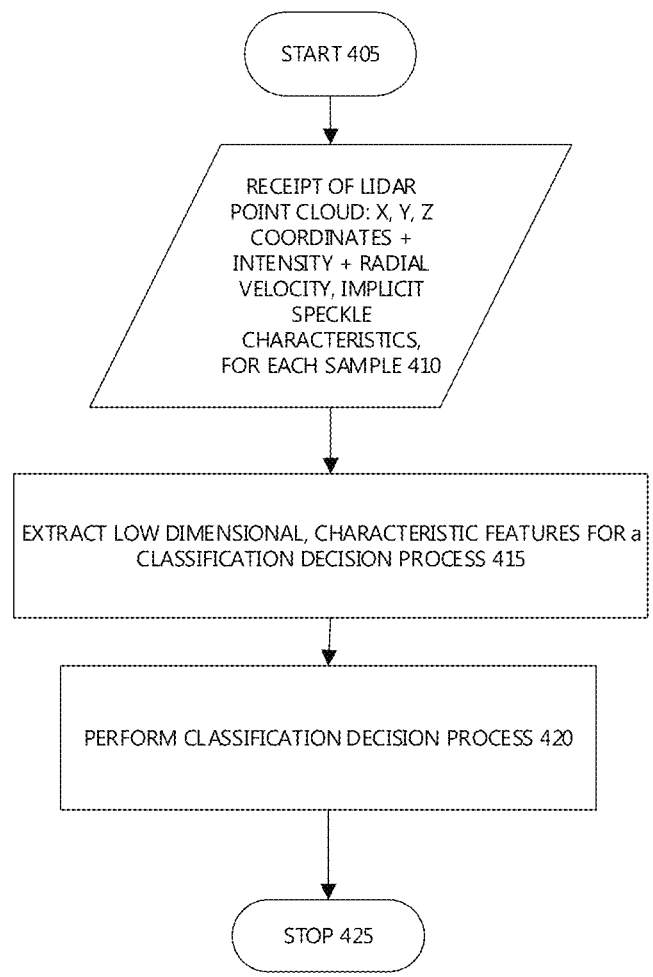
FIG. 4 illustrates the operation of performing deep neural network operations to perform feature extraction and classification based on low-dimensional characteristic features in additional detail.

FIGS. 3-4 illustrate an example data analysis performed in accordance with the disclosed embodiments. As shown in FIG. 3, operations begin at 305 and control proceeds to 310, at which generated data from the FMCW LiDAR sensor is received. Control then proceeds to 315, at which LiDAR point cloud data is generated, including x, y, and z coordinates, intensity data, and radial velocity data, as well as speckle characteristics for each sample of the generated data received at 310. It should be understood that the speckel characteristics are implicit information and can only be directly obtained; thus, it is possible that the sensor may receive more or less actual returns depending on roadway surface roughness.

Control then proceeds to 320, at which deep neural network operations are performed to perform feature extraction and classification based on low-dimensional characteristic features 320. This is discussed further herein with reference to FIG. 4.

Control then proceeds to 325, at which data is analyzed to identify indicating existence of roadway rut(s) in a format for use by vehicle components for determining on-road localization (e.g., for use for providing autonomous and/or assistive functionality). Control then proceeds to 330, at which that data is output to on-vehicle autonomous and/or assistive functional components. Control then proceeds to 335, at which operations end.

As shown in FIG. 4, the operation of performing deep neural network operations are performed to perform feature extraction and classification based on low-dimensional characteristic features 320 (see FIG. 3) may begin at 405, wherein control then proceeds to 410, at which LiDAR point cloud data is received. This may include x, y, z coordinates, intensity data, radial velocity data and implicit speckle characteristics for each sample included in the received LiDAR data. Control may then proceed to 415, at which low dimensional characteristic features may be extracted. Control then proceeds to 420 at which the classification process is performed on those extracted features and control proceeds to 425, at which the deep neural network operations for feature extraction and classification end.

It should be understood that, as shown in FIG. 4, extraction of features and classification can also be performed in a single component (e.g., a single Convolutional Neural Network), as in FIG. 3. Accordingly, disclosed embodiments may implemented in a single component or multiple components without diverging from the inventive concept.

Figure 5:
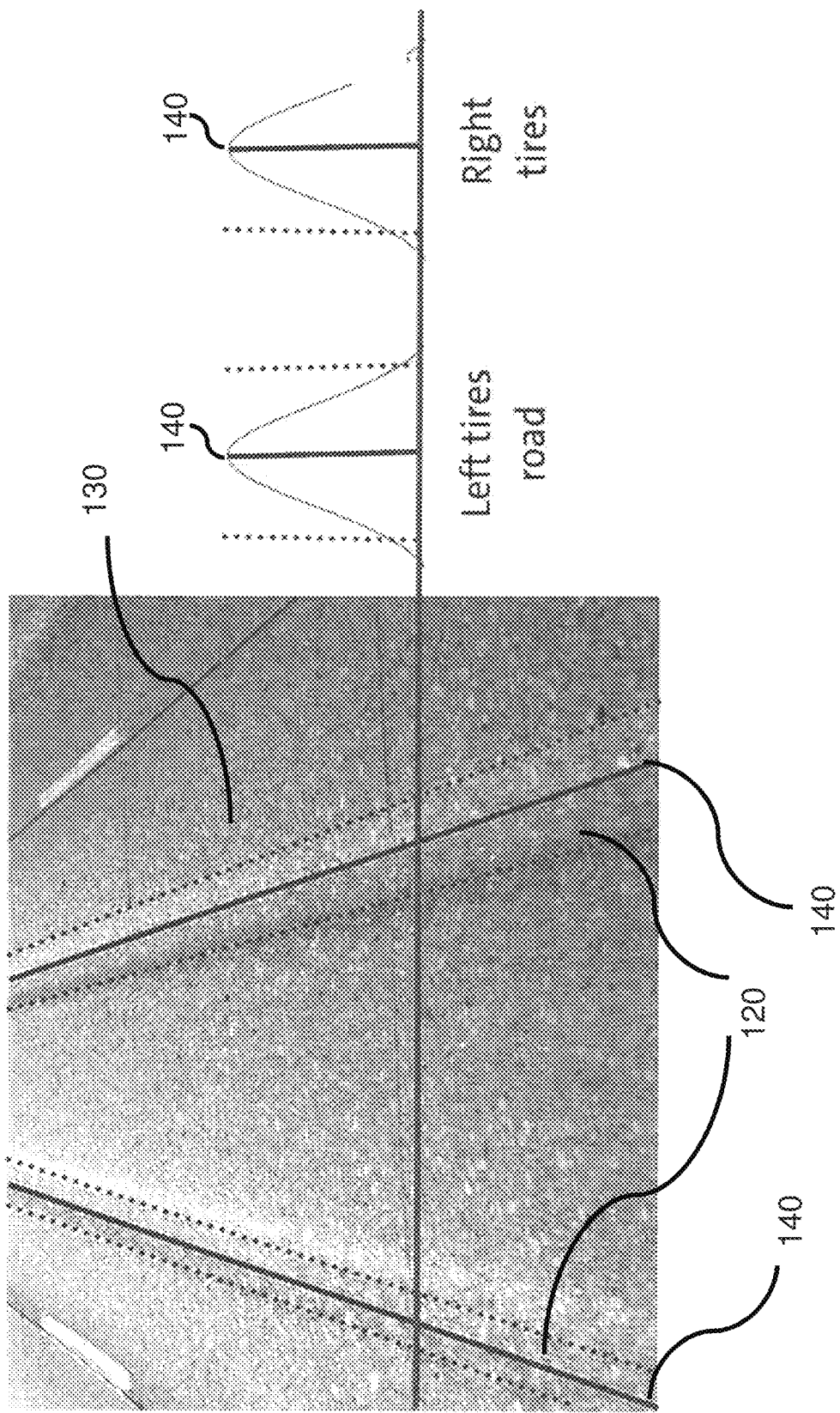
FIG. 5 illustrates an example of the surface profile in a roadway area including road wear/wheel ruts.

The performed operations depicted in FIGS. 3-4 enable differentiation of surface profiles indicative of road wear/wheel ruts from other parts of a roadway. For example, as shown in FIG. 5, the surface profile in the area of the road wear/wheel ruts 120 (between the dotted lines) correspond to the area when transportation vehicles have extensively worn the roadway surface compared to the remaining roadway surface 130 (e.g., in the middle of the roadway between the road wear and between road wear and lane markings).

From the combination of the full point cloud data that the sensor provides (x, y, z coordinate, reflectivity and radial velocity per return) and the absolute number of returns generated in the data, operations can be performed to identify the road wear reference lines 140 when LiDAR scanning is performed at the points along a horizontal line. More specifically, transitions between rougher surfaces 130 and smoother surfaces 120 are indicated by the dashed lines from which a corresponding center of the rut 140 can be determined, as indicated by the solid line 140 positioned in the middle of the dashed lines.

Thus, road wear can be identified and used to assist or automate alignment of the center of a transportation vehicle's wheels on the center of the road wear. In this regard, it should be noted, that the road wear/rut may be typically wider than the tire width of a typical car because tire widths vary from vehicle to vehicle and different types of vehicles (e.g., truck v. car), and there is some degree of variation in driving preference as where to position a vehicle in a lane of travel from driver to driver. Even taking into consideration such variations, however, road wear is an indicator of past behavior of majority of drivers. As a result, performing on-road localization based, at least in part, on such data increases the ability to perform on-road localization for the purposes of autonomous and/or assistive functionality in transportation vehicles.

It should be understood that these different surface types can be distinguished by utilizing deep neural networks (for example, as shown in FIGS. 3 and 4) for performing machine learning methods for data analysis, transforming the high-dimensional sensor data to characteristic low dimensional features that serve as simple and fast processable distinctive criteria. For example, computer vision and machine learning with speckle patterning analysis may be performed, e.g., using one or more of various deep neural network operations including those implemented using Convolutional Neural Networks (CNNs), Recurrent Neural Network (RNNs), convolutional autoencoders, Generative Adversarial Networks (GANs), Graph Neural Networks (GNNs), Siamese/Triplet Networks or the like.

For example, analysis of LiDAR point cloud data may be performed using various types of machine learning operations including supervised learning, unsupervised learning, deep learning and what may be termed supervised deep learning.

In accordance with at least one embodiment, unsupervised learning may be performed to automatically identify a threshold on feature values that distinguish smooth from rough areas, e.g., using an unsupervised clustering approach such as with a convolutional autoencoder described herein.

In accordance with at least one embodiment, unsupervised classification (e.g., One-Class Support Vector Machine, k-means clustering, density based clustering such as DBSCAN, distribution based clustering such as Expectation Maximization, subspace clustering) may be performed as a combination of clustering with dimension reduction, e.g., Principal Component Analysis/Singular Value Decomposition).

Optionally, in addition, supervised learning, which is the most common form of machine learning, involves enabling learning during a training phase based on a set of training data so as to enable the ability to learn to recognize how to label input data for categorization. Deep learning improves upon the supervised learning approach by considering several levels of representation, in which every level use the information from a previous level to learn more deeply. Deeper architectures of many stacked layers is one aspect, also CNNs take into account 2D/3D local neighborhood relations in pixel/voxel space by convolution over spatial filters.

Thus, supervised deep learning involves the application of multiple levels, or phases, of functional operations to improve understanding of resulting data then fed into further functional operations. For example, supervised deep learning for classification of data into one or more categories may be performed, for example, by performing feature learning (involving one or more phases of convolutions, Rectifier Linear Units (ReLUs) and pooling) to enable subsequent classification of sample data to identify learned features by application of a softmax function to enable differentiation between objects and background in the input image data. These operations may be performed to generate image class labels for classification purposes.

Likewise, supervised deep learning operations may be performed for regression by operating in parallel on RGB image and distance to ground/disparity map data by performing multiple convolutions and joining the result through concatenation for subsequent processing. These operations may be performed to generate image regression labels for subsequent use in analysis.

Moreover, supervised deep learning operations may be performed for semantic segmentation by inputting RGB image data into a convolutional encoder/decoder that my include multiple stages of convolution, batch normalization (which does not only apply to segmentation but applies to other networks as well), ReLUS and pooling, followed multiple phases of convolution, batch normalization and ReLUS with upsampling. The resulting data may then be processed by application of a softmax function to provide output data with segmentation labelling for each pixel.

As mentioned above, analysis of LiDAR point cloud data may also be performed by convolutional autoencoders by using unsupervised learning, set of training data are not associated with class labels such that data is generated and organized system develops and organizes the data, searching for common characteristics, for example, in clustering. In accordance with the disclosed embodiments, unsupervised deep learning operations may be performed, for example, for feature extraction in image data. As a result, frames of input data may be input into multiple convolutional and pooling layers in an encoder followed by processing by multiple deconvolutional and pooling layers. The result of such feature extraction operations enables the ability to effectively detect anomalies in the image data or to identify multiple categories in the data (such as rough and smooth surfaces).

Additionally, GANs may be used to perform what may be termed "semi-supervised learning" for data augmentation and domain adaption. In semi-supervised learning by GANs, random noise may be input into an image generator to generate a fake image that is then compared against a data training set to enable a discriminator to distinguish between the training data (i.e., real data) and the fake data. Thus, it should be understood that such operations generate image data with some labels as well.

Siamese/triplet networks may, likewise, be used for similarity learning to enable machine learning components to recognize similarity between data sets as well as different categories within one data set.

Furthermore, RNNs may be used to analyze time-dependent behavior in input/output relational data by, for example, modelling or describing the behavior and, potentially, predict a time series with a trained RNN.

In accordance with at least one disclosed embodiment, the road wear reference line data may also be used to assist in clarifying or analyzing data detected or accessed by on-vehicle equipment to identify lane markings, for example, when lane markings are not visible or are confusing. This reference to and analysis of a road wear reference line data improves safety by augmenting lane marking data generated by one or more on-vehicle data sensors or accessed in one or more databases. Thus, it should be understood that, although the disclosed embodiments may be utilized for the purposes of facilitating robust autonomous and/or assistive transportation vehicle functionality generally, the disclosed embodiments may have particular utility in providing that functionality when a lane width in increased temporarily at a roadway junction such as an on ramp or off ramp of a highway. Such roadway areas can cause temporary confusion of human drivers because they are unable to determine when and at what location to change direction to commit to one pathway in a junction. As a result, it may be presumed that autonomous and/or assistive functionality may similarly find such a determination difficult.

Figure 6:
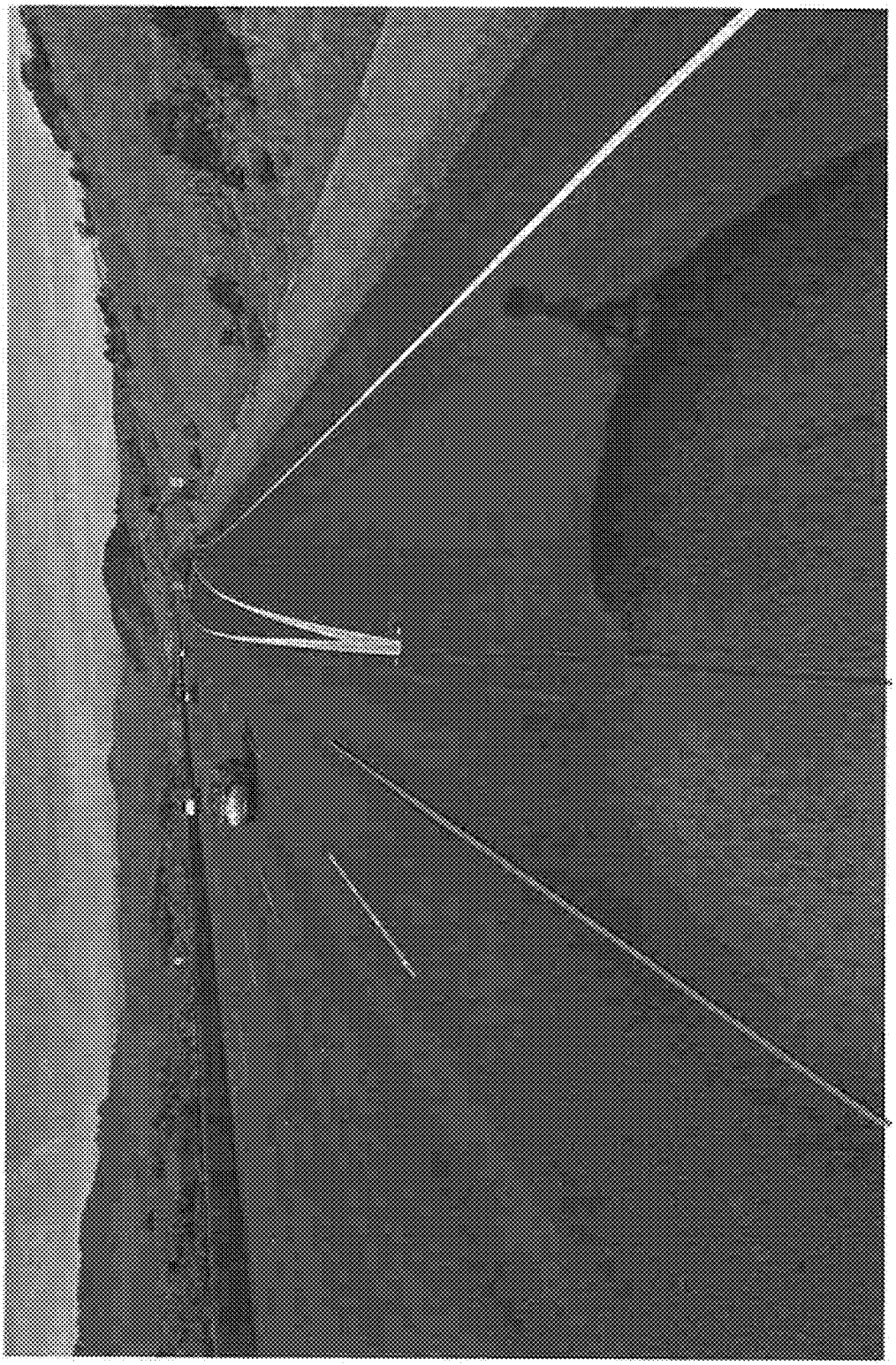
FIG. 6 illustrates an example of an exit scenario wherein the distance between the lane markings is wider than a typical lane width which creates confusion.

For example, FIG. 6 shows an exit scenario wherein the distance between the lane markings is wider than a typical lane width. Thus, it should be understood that, in accordance with disclosed embodiments, autonomous and/or assistive functionality may be performed using a driving path prediction algorithm based on ruts as well as lane markings because consideration of lane markings only would result in positioning of the transportation vehicle in the middle the increased lane width, which is potentially unsafe. Accordingly, detecting and analyzing ruts in the roadway in such regions may provide improved safety as part of autonomous and/or assistive functionality. This may be particularly true if the roadway includes a change in elevation that may result in increased risk of loss of vehicle control, resulting from, for example, lose gravel, ice, water, etc.

Further, it should be understood that, although the disclosed embodiments may be utilized for the purposes of facilitating robust autonomous and/or assistive transportation vehicle functionality generally, the disclosed embodiments may have particular utility in providing that functionality when lane markings are obscured as a result of weather conditions such as snow. In such conditions, lane markings and roadside patterns conventionally used to assist in on-road localization are obscured. For example, snow of any amount can obscure lane markings and road signs; additionally, snow of a large amount can alter the appearance of surroundings along a roadway to the point that roadside patterns cannot be analyzed to provide additional data to be combined with GPS analysis for performing on-road localization.

In accordance with at least one disclosed embodiment, the road wear reference line data may be used in combination with data detected or accessed by on-vehicle equipment to identify lane markings to control, guide, advise or otherwise facilitate alignment of the transportation vehicle wheel centers (e.g., the lateral center of the wheel surface that makes contact with the roadway) with the detected centers of the road wear to facilitate improved navigation of the transportation vehicle in relationship to the roadway. This reference to and analysis of a plurality of data sets generated by a plurality of on-vehicle data sensors or accessed in one or more databases provides additional redundancy regarding monitored data, and, therefore, increased safety regarding the on-vehicle systems that enable control, guiding, advisement for navigating the transportation vehicle on the roadway.

Thus, it should also be understood that, in accordance with disclosed embodiments, on-road localization operation robustness can be increased by combining data generated by different sensors, including the FMCW LiDAR to improve reliability to account for the possibility that data generated by one or more of the sensors becomes unavailable or unreliable during autonomous and/or assistive functionality. This can occur when, for example, if lane markings are not visible or confusing (e.g. lane split/merge discontinuity) or GPS based localization becomes impossible because of tunnels or tall buildings obscuring access and reference to satellites.

In this regard, it should be understood that at least one embodiment may include a feedback mechanism that determines the quantity and/or quality of data produced and/or analyzed in the disclosed operations. Such a feedback mechanism may be used to selectively increase or decrease a reliance on the rut-based on-road localization data in provisioning autonomous and/or assistive functionality. This may be implemented, for example, by dynamically weighting data generated by different localization techniques/components based on a determination of the relative accuracy or availability of their generated data. It should be understood weighting of data may be based on weather, amount of ambient light, known roadway conditions stored in a database for cross reference with GPS data determined for the transportation vehicle. It should also be understood that such a feedback mechanism may include comparison with threshold values for maintaining at least minimum parameters to ensure safety for autonomous and/or assistive functionality operation.

Further it should be understood that a mechanism for dynamically weighting such data may be performed in one or more of various conventionally known techniques that enable Sensor Data Fusion, for example, using a Kalman Filter, processing performed based on the central limit theorem, Bayesian networks, the Dempster-Shafer theorem, CNNs or any of the other mathematical operations disclosed herein.

Figure 7:
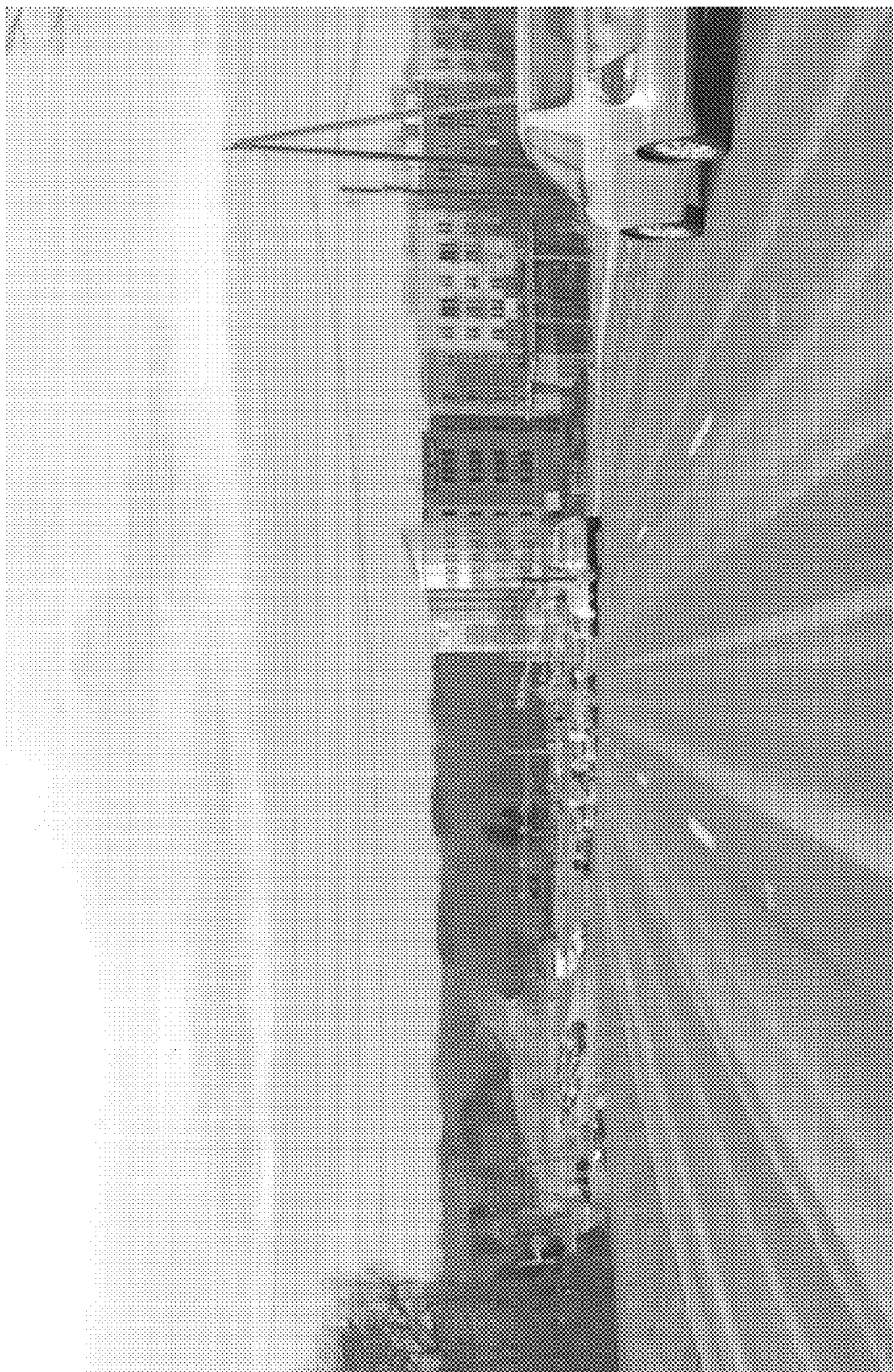
FIG. 7 illustrates an example of lines of treatment chemical applied to a roadway in preparation for freezing or frozen precipitation.
Figure 8:
FIG. 8 illustrates a further example of lines of treatment chemical applied to a portion of roadway including a turning lane in preparation for freezing or frozen precipitation.
Figure 9:
FIG. 9 illustrates an example of a portion of roadway that includes a deposit of material that was initially applied to the roadway in preparation for freezing or frozen precipitation but has worn off the roadway and deposited in area of an intersection in the roadway that transportation vehicles do not drive.

Although the above-description has made reference to rut-based localization data, it should be understood that road conditions may be such that other data may be similarly used to improve autonomous and/or assistive transportation vehicle functionality. For example, FIGS. 7-9 illustrate various examples of roadway conditions that occur as a result or in preparation for freezing or frozen precipitation. For example, FIG. 7 illustrates an example of lines of treatment chemical, e.g., magnesium chloride or calcium chloride, applied to a roadway in preparation for freezing or frozen precipitation. As is shown in FIG. 7, the application of these chemicals generally form lines that runs parallel to roadway lane markings because the vehicles applying the chemicals must obey traffic rules including staying within lanes of travel. Accordingly, it should be understood that using FMCW LiDAR to identify such lines may enable further analysis to determine how best to stay within a lane of traffic. Thus, it should be understood that a sensing of a plurality of lines of roadway treatment materials may enable improving the ability to center a transportation vehicle within a lane of traffic.

Similarly, FIG. 8 illustrates a further example of lines of treatment chemical applied to a portion of roadway including a turning lane in preparation for freezing or frozen precipitation. As shown in FIG. 8, a plurality of lines of roadway treatment materials further differentiate an appropriate pathway that diverges from a main roadway into a turning lane via an exit region of the roadway, denoted in lane markings by smaller dashed lines then what is present on the main roadway. Accordingly, sensing and analyzing such lines may assist in provision of autonomous and/or assistive transportation vehicle functionality.

Further, it should be understood that FMCW LiDAR may be used to identify regions of roadway that include deposits of material that was initially applied to the roadway in preparation for freezing or frozen precipitation. For example, FIG. 9 illustrates an example of a portion of roadway that includes a deposit of material, e.g., magnesium chloride or calcium chloride that was initially applied to the roadway in preparation for freezing or frozen precipitation but has worn off the roadway and deposited in area of an intersection in the roadway that transportation vehicles do not drive. Thus, sensing and analyzing such deposit may assist in provision of autonomous and/or assistive transportation vehicle functionality.

Further, it should be understood that, in relation to providing such functionality in environmental conditions that decrease the ability to provide that functionality because of precipitation and/or lighting, sensing, monitoring and analyzing such additional road characteristics may improve the accuracy, robustness and efficiency of autonomous and/or assistive functionality equipment.

As explained above, disclosed embodiments may be implemented in conjunction with components of autonomous and/or assistive driving systems included in transportation vehicles. Thus, the utility of the disclosed embodiments within those technical contexts has been described in detail. However, the scope of the innovative concepts disclosed herein is not limited to those technical contexts.

Additionally, it should be understood that the presently disclosed means for analyzing image data depicting a roadway on which the transportation vehicle may comprise any combination of the sensors and functionality disclosed herein implemented in hardware and/or software to provide the disclosed functionality.

Likewise, it should be understood that presently disclosed means for facilitating alignment of a center of at least one wheel surface of a wheel of the transportation vehicle wheel with the detected center of the road wear reference line would at least in part be implemented using the autonomous and/or assistive driving functionality (and corresponding technological systems) to provide that functionality at varying levels (described herein) depending on the degree of control to be provided for a transportation vehicle.

Moreover, it should be understood that such assistive technology may include but is not limited to what may have been conventionally termed a Driver Assistance System (DAS) or an Advanced Driver Assistance System (ADAS) implemented using hardware and software included in a transportation vehicle. These conventionally known systems assist the driver in decision and control, but inevitably the decisions and control are the responsibility of the driver. Further, these systems can be either "active" or "passive" in how they are implemented. Active DAS means that the vehicle itself controls various longitudinal and/or lateral aspects of the vehicle's driving behavior, or rather, very specific driving tasks, through its sensors, algorithms, processing systems, and actuators. Passive DAS means that the vehicle will simply assist the driver, through its sensors, algorithms, processing systems, and human-machine interfaces (HMIs) with controlling various longitudinal and/or lateral aspects of vehicle control. For example, in a collision avoidance situation an active system would bring the vehicle to a stop or route the vehicle around the obstacle in the immediate path. A passive system would provide some type of visual, auditory, and haptic cues to the driver to stop or route the vehicle around the obstacle.

Thus, a DAS system helps the driver with many tasks ingrained into the driving process and implemented specifically for the purpose to increase car and road safety, as well as driver convenience. Such DAS systems include, but are not limited to cruise control, Adaptive Cruise Control (ACC), active steering for lane keeping, lane change assistance, highway merge assistance, collision mitigation and avoidance systems, pedestrian protection systems, automated and/or assistive parking, sign recognition, blind spot detection for collision mitigation, and stop and go traffic assistance. Accordingly, the disclosed embodiments provide additional, and potentially more accurate data to such DAS systems to provide this assistive functionality.

It should further be understood that disclosed embodiments utilize functionality from multiple different technological fields to provide an additional mechanism and methodologies for performing on-road localization to facilitate autonomous and/or assistive driving functionality by combining analysis performed in computer vision and machine learning with speckle patterning analysis innovations in materials science.

Further, it should be understood that, if speckle is present, the point cloud will lack points in various areas. Taking the entire information of the point-cloud into account, the speckle might introduce characteristic patterns that give insight into the roughness of the road. It is to be expected that these cues caused by speckle can only be properly interpreted by a machine learning approach. Further, the wavelength used by the laser system as well as the angle of incidence between a given LiDAR ray and the surface will impact the measurement and the speckle that can be expected. Further, the integration time of the laser is of interest. All these factors need to be considered in the technical realization of this approach.

Geometrical and statistical parameters have been shown conventionally to enable characterization of road pavement surface texture at the macro and micro scale. These characteristics can be measured with the use of profile meters, wherein triangulation lasers are combined with Charge Coupled Device (CCD)/Complementary Metal-Oxide-Semiconductor (CMOS) sensors to perform asphalt texture characterization. Nevertheless, conventionally known measurement and analysis of generated data as a three-dimensional point cloud has been slower than real-time. Additionally, post processing 3D displacement measurement has been conventionally performed only in fixed mounted experimental setups with Electronic Speckle Pattern Interferometry (ESPI) sensors.

Thus, such operations have not been conventionally considered or could have been implemented in the real world for the purposes of on-road localization to support autonomous and/or assistive transportation vehicle functionality.

While the functionality of the disclosed embodiments and the system components used to provide that functionality have been discussed with reference to specific terminology that denotes the function to be provided, it should be understand that, in implementation, the component functionality may be provided, at least in part, components present and known to be included in conventional transportation vehicles.

For example, as discussed above, disclosed embodiments use software for performing functionality to enable measurement and analysis of data, at least in part, using software code stored on one or more non-transitory computer readable mediums running on one or more processors in a transportation vehicle. Such software and processors may be combined to constitute at least one controller coupled to other components of the transportation vehicle to support and provide autonomous and/or assistive transportation vehicle functionality in conjunction with vehicle navigation systems, and multiple sensors. Such components may be coupled with the at least one controller for communication and control via a CANbus of the transportation vehicle.

It should further be understood that the presently disclosed embodiments may be implemented using dedicated or shared hardware included in a transportation vehicle. Therefore, components of the module may be used by other components of a transportation vehicle to provide vehicle functionality without departing from the scope of the invention.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method steps, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative steps may be employed.

Disclosed embodiments include the methods described herein and their equivalents, non-transitory computer readable media programmed to carry out the methods and a computer system configured to carry out the methods. Further, included is a vehicle comprising components that include any of the methods, non-transitory computer readable media programmed to implement the instructions or carry out the methods, and systems to carry out the methods. The computer system, and any sub-computer systems will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

Various embodiments of the invention have been described, each having a different combination of elements. The invention is not limited to the specific embodiments disclosed, and may include different combinations of the elements disclosed, omission of some elements or the replacement of elements by the equivalents of such structures.

The invention claimed is:

1. Transportation vehicle equipment for performing on-roadway localization, the equipment comprising:

at least one LiDAR sensor;
at least one processor running software configured to:
generate LiDAR point cloud data based on data received from the at least one LiDAR sensor, wherein the LiDAR point cloud data comprise speckle characteristics for samples of the generated data, wherein the speckle characteristics are based on optical interference of back scattered light that result from coherent illumination of object surfaces with laser light generated by the LiDAR sensor;
analyze the LiDAR point cloud data to detect at least one road wear reference line in a roadway on which the transportation vehicle is travelling, wherein speckle pattern analysis is utilized to provide information for detecting road wear based on a variation of the road surface roughness, wherein the speckle pattern analysis analyzes the speckle characteristics in the LiDAR point cloud data for characteristic patterns indicative of the road surface roughness; and
facilitate alignment of a center of at least one wheel surface of a transportation vehicle wheel with the detected center of the road wear reference line,
wherein the analysis of the LiDAR point cloud data analyzes LiDAR point cloud data including x, y, and z coordinates, intensity data, and radial velocity data.

2. The transportation vehicle equipment of claim 1, wherein the at least one processor is further configured to provide autonomous and/or assistive functionality for operating the transportation vehicle to travel on the roadway, which includes the facilitation of the alignment of the center of the at least one wheel surface of the transportation vehicle wheel with the detected center of the road wear reference line.

3. The transportation vehicle equipment of claim 2, wherein the transportation vehicle includes a plurality of sensors including the at least one sensor, and wherein the equipment for providing autonomous and/or assistive functionality analyzes data generated by the plurality of sensors to provide the autonomous and/or assistive functionality in the transportation vehicle.

4. The transportation vehicle equipment of claim 3, wherein the equipment for providing autonomous and/or assistive functionality alters a weighting of sensor data from at least some of the plurality of sensors based on analysis of data indicating reliability and/or availability of the sensor data from the plurality of sensors.

5. The transportation vehicle equipment of claim 1, wherein the at least one LiDAR sensor is a Frequency Modulated Continuous Wave (FMCW) LiDAR sensor.

6. The transportation vehicle equipment of claim 5, wherein the FMCW LiDAR provides coherent LiDAR using a continuously-emitting laser that varies frequency through a range and compares the frequency of returned signals with corresponding local reference signal to determine distance to a target.

7. The transportation vehicle equipment of claim 1, wherein the analysis of the LiDAR point cloud data uses deep neural network operations to perform feature extraction and classification based on low-dimensional characteristic features.

8. The transportation vehicle equipment of claim 7, wherein the deep neural network operations perform machine learning methods for data analysis to transform high-dimensional sensor data generated by the at least one sensor to characteristic low dimensional features.

9. The transportation vehicle equipment of claim 7, wherein the deep neural network operations utilize deep neural networks for performing machine learning methods for data analysis including speckle pattern analysis.

10. The transportation vehicle of equipment of claim 7, wherein the deep neural network operations perform machine learning methods for data analysis include as least one of application of Convolutional Neural Networks (CNNs), Recurrent Neural Network (RNNs), use of convolutional autoencoders, application of Generative Adversarial Networks (GANs), Siamese/Triplet Networks, and/or Graph Neural Networks (GNNs).

11. The transportation vehicle equipment of claim 1, wherein the alignment facilitation includes a lane departure warning system configured to warn a driver of the transportation vehicle when the vehicle begins to move out of its lane of traffic on the roadway.

12. The transportation vehicle equipment of claim 1, wherein the alignment facilitation includes a lane departure warning system configured to control steering of the transportation vehicle to maintain its lane of traffic on the roadway.

13. The transportation vehicle equipment of claim 1, wherein the analysis of image data depicting a roadway on which the transportation vehicle is travelling detects a presence or absence of road treatment material on the roadway based on the at least one sensor mounted to the transportation vehicle, wherein the data indicating the presence or absence of the road treatment material is taken into consideration during the alignment facilitation so as to provide lane departure warning functionality.

14. The transportation vehicle equipment of claim 1, wherein the characteristic patterns result from a lack of points within the LiDAR point cloud data that results where speckle is present.

15. A method of performing on-roadway localization using equipment included in a transportation vehicle, the method comprising:
   generating LiDAR point cloud data based on data received from at least one LiDAR sensor mounted to the transportation vehicle, wherein the LiDAR point cloud data comprise speckle characteristics for samples of the generated data, wherein the speckle characteristics are based on optical interference of back scattered light that result from coherent illumination of object surfaces with laser light generated by the LiDAR sensor;
   analyzing the LiDAR point cloud data to detect at least one road wear reference line in a roadway on which the transportation vehicle is travelling, wherein speckle patterning analysis is utilized to provide information for detecting road wear based on a variation of the road surface roughness, wherein the speckle pattern analysis analyzes the speckle characteristics in the LiDAR point cloud data for characteristic patterns indicative of the road surface roughness; and
   facilitating, based on the analysis of LiDAR point cloud data, of alignment of a center of at least one wheel surface of a wheel of the transportation vehicle with the detected center of the road wear reference line,
   wherein the analyzing LiDAR point cloud data analyzes LiDAR point cloud data including x, y, and z coordinates, intensity data, and radial velocity data.

16. The on-roadway transportation vehicle localization method of claim 15, providing autonomous and/or assistive functionality for operating the transportation vehicle to travel on the roadway by the facilitating alignment of the center of the at least one wheel surface of the transportation vehicle wheel with the detected center of the road wear reference line.

17. The on-roadway transportation vehicle localization method of claim 16, wherein the transportation vehicle includes a plurality of sensors including the at least one sensor, and wherein the providing of the autonomous and/or assistive functionality analyzes data generated by the plurality of sensors to provide the autonomous and/or assistive functionality in the transportation vehicle.

18. The on-roadway transportation vehicle localization method of claim 17, wherein the autonomous and/or assistive functionality is provided by altering a weighting of sensor data from at least some of the plurality of sensors based on analysis of data indicating reliability and/or availability of the sensor data from the plurality of sensors.

19. The on-roadway transportation vehicle localization method of claim 15, wherein the at least one LiDAR sensor is a Frequency Modulated Continuous Wave (FMCW) LiDAR sensor.

20. The on-roadway transportation vehicle localization method of claim 19, wherein the FMCW LiDAR provides coherent LiDAR using a continuously-emitting laser that varies frequency through a range and compares the frequency of returned signals with corresponding local reference signal to determine distance to a target.

21. The on-roadway transportation vehicle localization method of claim 15, wherein the analysis of LiDAR point cloud data uses deep neural network operations to perform feature extraction and classification based on low-dimensional characteristic features.

22. The on-roadway transportation vehicle localization method of claim 21, wherein the deep neural network operations utilize deep neural networks for performing machine learning methods for data analysis to transform high-dimensional sensor data generated by the at least one sensor to characteristic low dimensional features.

23. The on-roadway transportation vehicle localization method of claim 21, wherein the deep neural network operations utilize deep neural networks for performing machine learning methods for data analysis including speckle pattern analysis.

24. The on-roadway transportation vehicle localization method of claim 21, wherein the deep neural network operations utilize deep neural networks for performing machine learning methods for data analysis include as least one of application of Convolutional Neural Networks (CNNs), Recurrent Neural Network (RNNs), use of convolutional autoencoders, application of Generative Adversarial Networks (GANs), Siamese/Triplet Networks, and/or Graph Neural Networks (GNNs).

25. The on-roadway transportation vehicle localization method of claim 15, wherein the facilitating alignment includes performing operations for warning of a lane departure to warn a driver of the transportation vehicle when the vehicle begins to move out of its lane of traffic on the roadway.

26. The on-roadway transportation vehicle localization method of claim 15, wherein the facilitating alignment includes performing lane operations for warning of a lane departure to control steering of the transportation vehicle to maintain its lane of traffic on the roadway.

27. The on-roadway transportation vehicle localization method of claim 15, wherein the analyzing of the image data depicting a roadway on which the transportation vehicle is travelling detects a presence or absence of road treatment material on the roadway based on the at least one sensor mounted to the transportation vehicle, wherein the data indicating the presence or absence of the road treatment material is taken into consideration for facilitating alignment so as to provide lane departure warning functionality.

28. The on-roadway transportation vehicle localization method of claim 15, wherein the characteristic patterns result from a lack of points within the LiDAR point cloud data that results where speckle is present.

29. A non-transitory, machine readable medium including machine readable software code, which, when executed on a processor, controls a method of performing on-roadway localization using equipment included in a transportation vehicle, the method comprising:

generating LiDAR point cloud data based on data received from at least one LiDAR sensor mounted to the transportation vehicle, wherein the LiDAR point cloud data comprise speckle characteristics for samples of the generated data, wherein the speckle characteristics are based on optical interference of back scattered light that result from coherent illumination of object surfaces with laser light generated by the LiDAR sensor;

analyzing the LiDAR point cloud data to detect at least one road wear reference line in a roadway on which the transportation vehicle is travelling, wherein speckle patterning analysis is utilized to provide information for detecting road wear based on a variation of the road surface roughness, wherein the speckle pattern analysis analyzes the speckle characteristics in the LiDAR point cloud data for characteristic patterns indicative of the road surface roughness; and facilitating, based on the analysis of LiDAR point cloud data, of alignment of a center of at least one wheel surface of a transportation vehicle wheel with the detected center of the road wear reference line, wherein the analyzing of the LiDAR point cloud data analyzes LiDAR point cloud data including x, y, and z coordinates, intensity data, and radial velocity data.

* * * * *